(12) United States Patent  (10) Patent No.: US 6,524,012 B1
Uchman  (45) Date of Patent: Feb. 25, 2003

(54) SECURING MEMBERS TOGETHER BY SPRING RINGS

(75) Inventor: Frederick Uchman, Clarkston, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/947,986

(22) Filed: Sep. 6, 2001

(51) Int. Cl.[7] .............................. F16C 13/00; F16D 3/22
(52) U.S. Cl. ....................... 384/544; 384/903; 403/317; 403/325; 464/178
(58) Field of Search .................................. 384/544, 536, 384/537, 589, 903; 403/315, 316, 317, 325; 464/178, 906

(56) References Cited

U.S. PATENT DOCUMENTS 2,136,125 A * 11/1938 Delaval-Crow ............. 384/903
4,602,876 A * 7/1986 Miki et al. ................... 384/539
5,549,514 A * 8/1996 Welschof ..................... 464/145
6,022,275 A * 2/2000 Bertetti ........................ 464/178
6,193,419 B1 * 2/2001 Krude et al. ................. 384/544
6,354,952 B1 * 3/2002 Boulton et al. ............. 464/145

* cited by examiner

Primary Examiner—Thomas R. Hannon
(74) Attorney, Agent, or Firm—Mick A. Nylander

(57) ABSTRACT

An assembly of an outer race of a constant velocity joint and part of a motor vehicle wheel bearing, wherein the outer race has a first bore and an internal groove in the bore, the bearing part and the race being held in assembled position by a spring ring engaged in the groove and in an external groove of the bearing part which has a second bore with an open end, the ring having, adjacent its ends, arms which extend generally radially inwardly through a slot extending radially of the second bore between an inner end open to the second bore and an outer end at the external surface of the bearing part, the slot extending axially between the external groove and an end of the bearing part.

19 Claims, 9 Drawing Sheets

US 6,524,012 B1

SECURING MEMBERS TOGETHER BY SPRING RINGS

TECHNICAL FIELD

This invention relates generally to the securing together against relative axial movement of two members in telescopic relation. The members are secured together by a spring ring which is received in cooperating grooves, an internal groove in the external member and an external groove in the internal member. In particular the invention relates to securing together the outer race of a constant velocity joint and part of a motor vehicle wheel bearing.

BACKGROUND OF THE INVENTION

Various proposals have been made for securing together the outer race of a constant velocity joint and part of a motor vehicle wheel bearing. Attention is drawn to U.S. Pat. No. 6,022,275 issued Feb. 8$^{th}$, 2000 to SKF Industrie S.p.A. and U.S. Pat. No. 6,193,419 issued Feb. 27$^{th}$, 2001 to GKN Automotive AG. Reference is also made to the publication WO99/13232 in the name of GKN Automotive AG. In this latter publication a spring ring is used which has arms at its ends which extend outwardly and these arms are embraced by a holding element which can hold the ring in one of the grooves while the parts are assembled and then removed to allow the ring to engage both grooves. Access to the holding element may be through the hole in the vehicle suspension knuckle which is normally used for an ABS sensor.

The area around the exterior of the wheel bearing is very confined and there is little space to manipulate the holding element.

SUMMARY OF THE INVENTION

It is an object of the present invention to provide an arrangement in which, when securing together the outer race of a constant velocity joint and a wheel bearing by means of a spring ring, the spring ring can be operated upon from the wheel side of the assembly and can thus allow easy assembly and disassembly of the parts in situ on a vehicle.

Another object of the invention is the provision of a sealing ring to seal the splined connection between the hub and the outer race of the constant velocity joint to prevent the ingress of road dirt etc. into the splined connection and the internal and external grooves.

According to one aspect of the invention we provide a method of securing together, by means of a spring ring, an external member in telescopic relation with an internal member, wherein the external member has a first bore and an internal groove in the first bore, wherein the internal member has an external groove, a second bore and a slot extending radially of the second bore between an inner end open to the second bore and an outer end at the external surface of the internal member, the slot extending axially between said external groove and an end of the internal member, wherein the spring ring is engaged in said grooves to secure the members together and has, adjacent to its ends, arms which extend generally radially inwardly; the method comprising mounting the spring ring in the external groove so that the arms extend inwardly through said slot into the second bore, releasably holding the ring in a contracted state so that it lies substantially within said external groove by engaging said arms in the second bore with holding means, telescoping the members together while the arms are engaged with the holding means until the grooves in the members are mutually aligned and disengaging the holding means from said arms to release the ring so that the ring expands to engage in both of the mutually aligned grooves to secure the members together.

Preferably the external member is part of the outer race of a constant velocity joint and the internal member is part of a motor vehicle wheel bearing.

According to another aspect of the invention we provide an assembly of an outer race of a constant velocity joint and part of a motor vehicle wheel bearing, wherein the outer race has a first bore and an internal groove in the bore, the bearing part and the outer race being held in assembled position by a spring ring engaged in said groove and in an external groove of the bearing part which has a second bore with an open end, the ring having, adjacent its ends, arms which extend generally radially inwardly through a slot extending radially of the second bore between an inner end open to the second bore and an outer end at the external surface of the bearing part, the slot extending axially between said external groove and an end of the bearing part.

In this arrangement the inwardly projecting arms of the ring can be operated upon through the open end of the second bore and can be gripped so as to locate the ring wholly in the external groove on the wheel hub part or to allow the ring to expand so as to be located in both the internal and the external grooves.

BRIEF DESCRIPTION OF THE DRAWINGS

The invention will now be described in detail with reference to the accompanying drawings which show four assemblies of a constant velocity joint outer race and a motor vehicle wheel bearing embodying the invention.

DETAILED DESCRIPTION OF THE PREFERRED EMBODIMENTS

Figure 1:
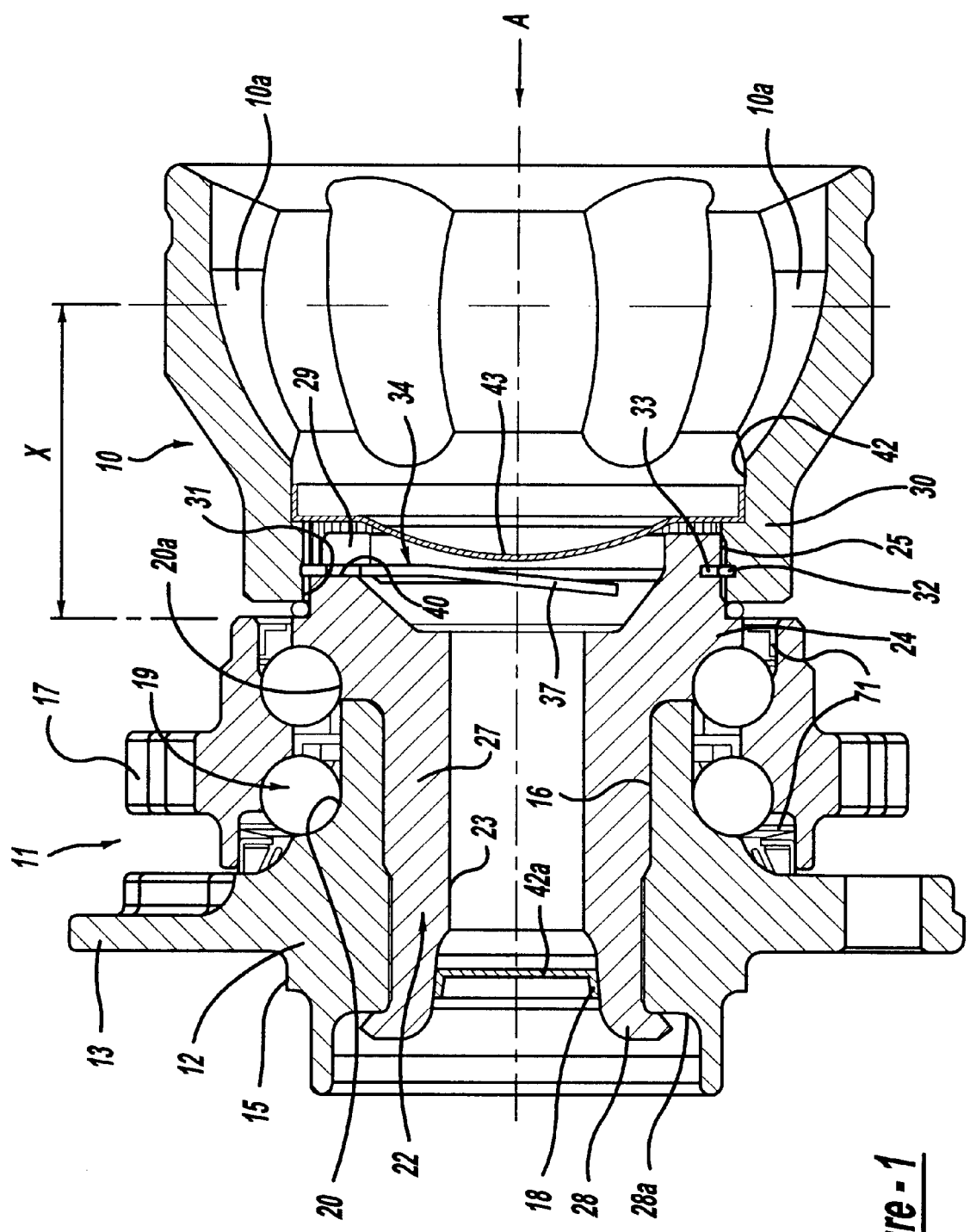
FIG. 1 is a vertical cross-section through a first embodiment of the invention.

Referring first to FIG. 1, there is shown an assembly of the outer race 10 of a constant velocity joint and a motor vehicle wheel bearing assembly indicated generally at 11. The assembly 11 includes a hub 12 having a flange 13 which carries bolts (not shown) to receive a vehicle road wheel (not shown) which is located on a spigot 15. The hub has a bore 16 and is rotatably mounted in a fixed part 17 which may be connected by bolts, not shown, to a suspension knuckle of a vehicle. There is a rolling element bearing 19 between the hub 12 and the fixed part 17. In the example shown the bearing is a double-ball bearing but may be a roller bearing. The outer races of the bearing are formed directly in the fixed part 17. The inner race of one of the bearing rows is indicated at 20 and is formed on the hub itself. The inner race of the other bearing row is indicated at 20a and is formed on a tubular securing element 22.

The tubular securing element 22 has a bore 23 and serves to pre-load the bearing 19 via the bearing race 20a and to locate the hub 12. At its right-hand end in FIG. 1 the securing element has a flange 24 tie outer surface of which is splined at 25. A tubular part 27 of the securing element passes through the bore 16 of the hub and at its left-hand end is swaged outwardly al 28 to engage a surface 28a on the hub. As the swaging sakes place a load is applied to the securing element so that it loads the bearing race 20a and thus pre-loads the bearing 19. The bore 16 of the hub 12 and the tubular part 27 of the securing element have inter-engaging splines 18.

The outer race 10 of the constant velocity joint has ball tracks 10a and a tubular neck portion 30 which is internally splined at 31. The splines 31 in the neck portion of the outer race engage the splines 25 on the flange 24. The outer race 10 will contain an inner race, cage and balls (not shown).

Figure 9:
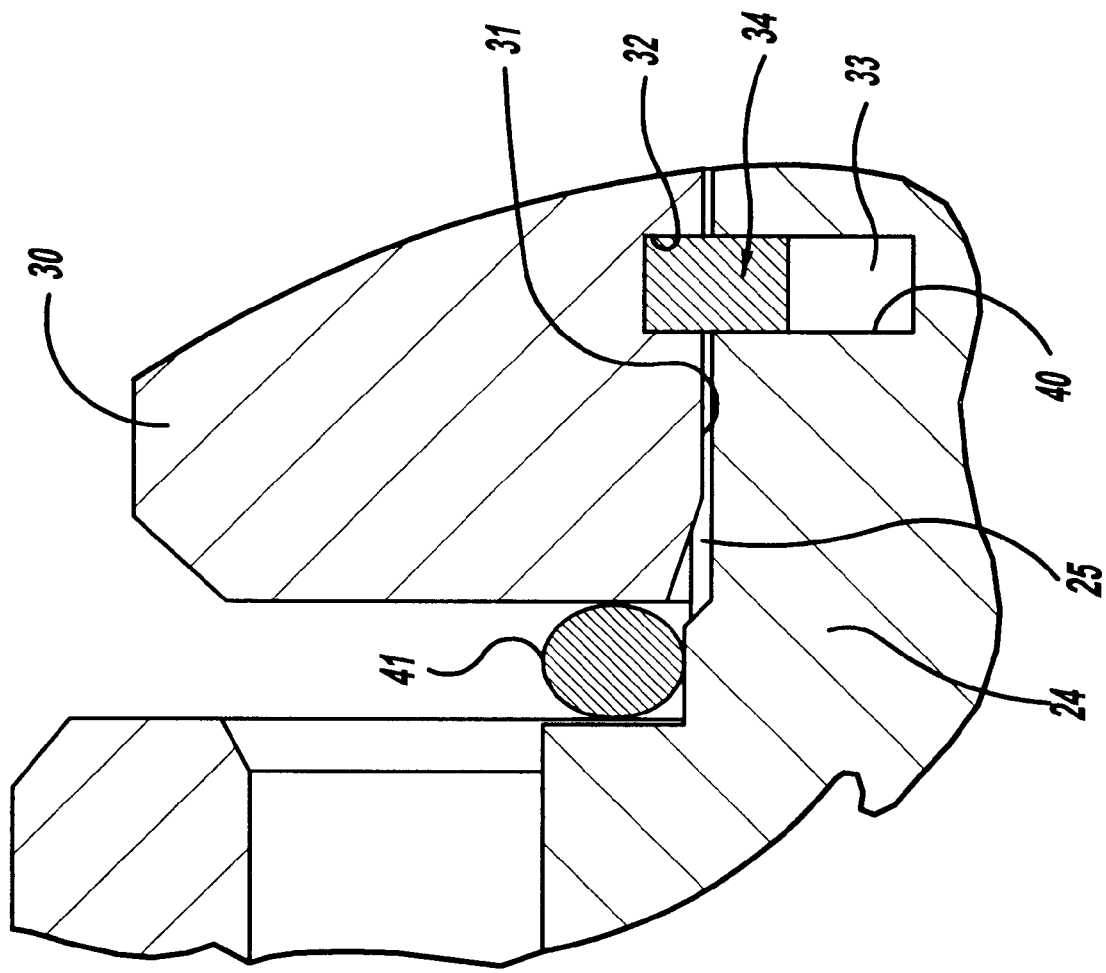
FIG. 9 shows the sealing ring and how the spring ring engages the internal and external grooves.

Referring to FIG. 9 the neck portion 30 of the outer race is provided with an internal groove 32 while the flange 24 is provided with an external groove 33. A spring ring 34 holds the parts aligned as will now be described.

Figure 6:
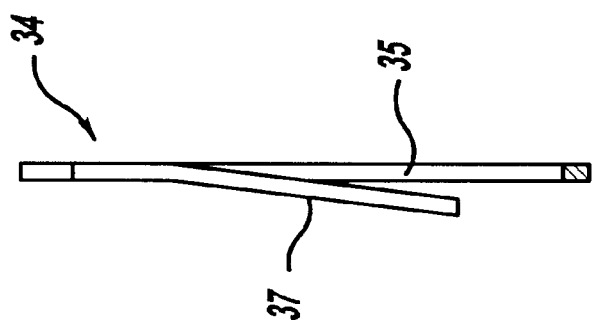
FIG. 6 is a sect ion of the ring of FIG. 5 on the line 6—6 of FIG. 5.
Figure 5:
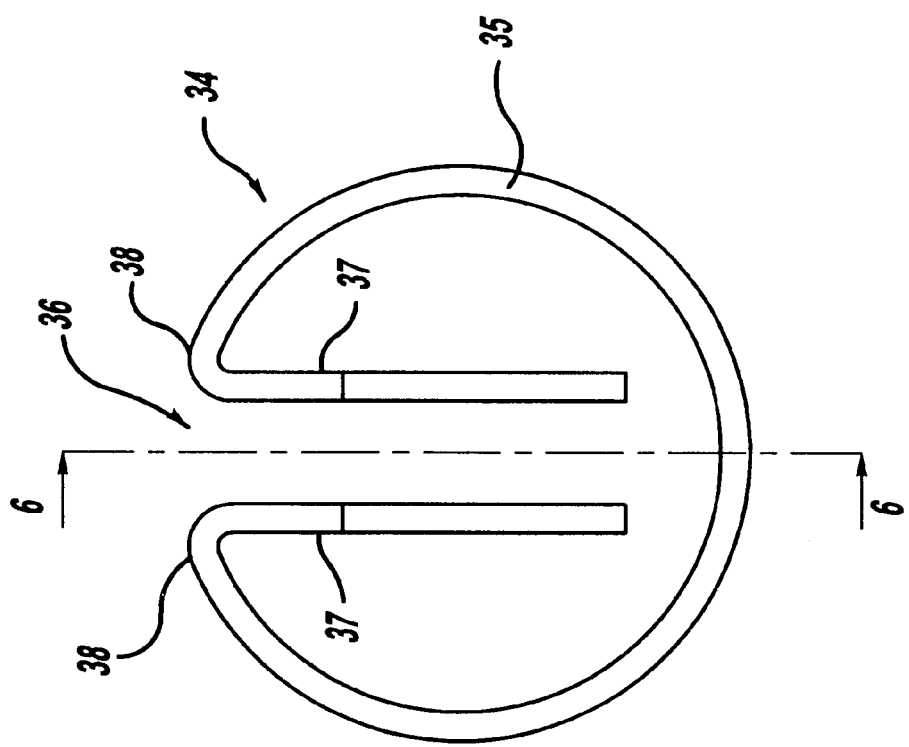
FIG. 5 is a front elevation of the spring ring used in all the embodiments.

The ring is shown in more detail in FIGS. 5 and 6. The ring comprises a generally circular part 35 which is not a complete circle but has a gap 36. At the ends 38 of its circular part the ring has arms 37 which project generally radially inwardly. As shown in FIG. 6, the arms 37 lie in a plane which is inclined to the plane which contains the circular portion 35. However, the arms could be in the same plane as the rest of the ring.

Figure 2:
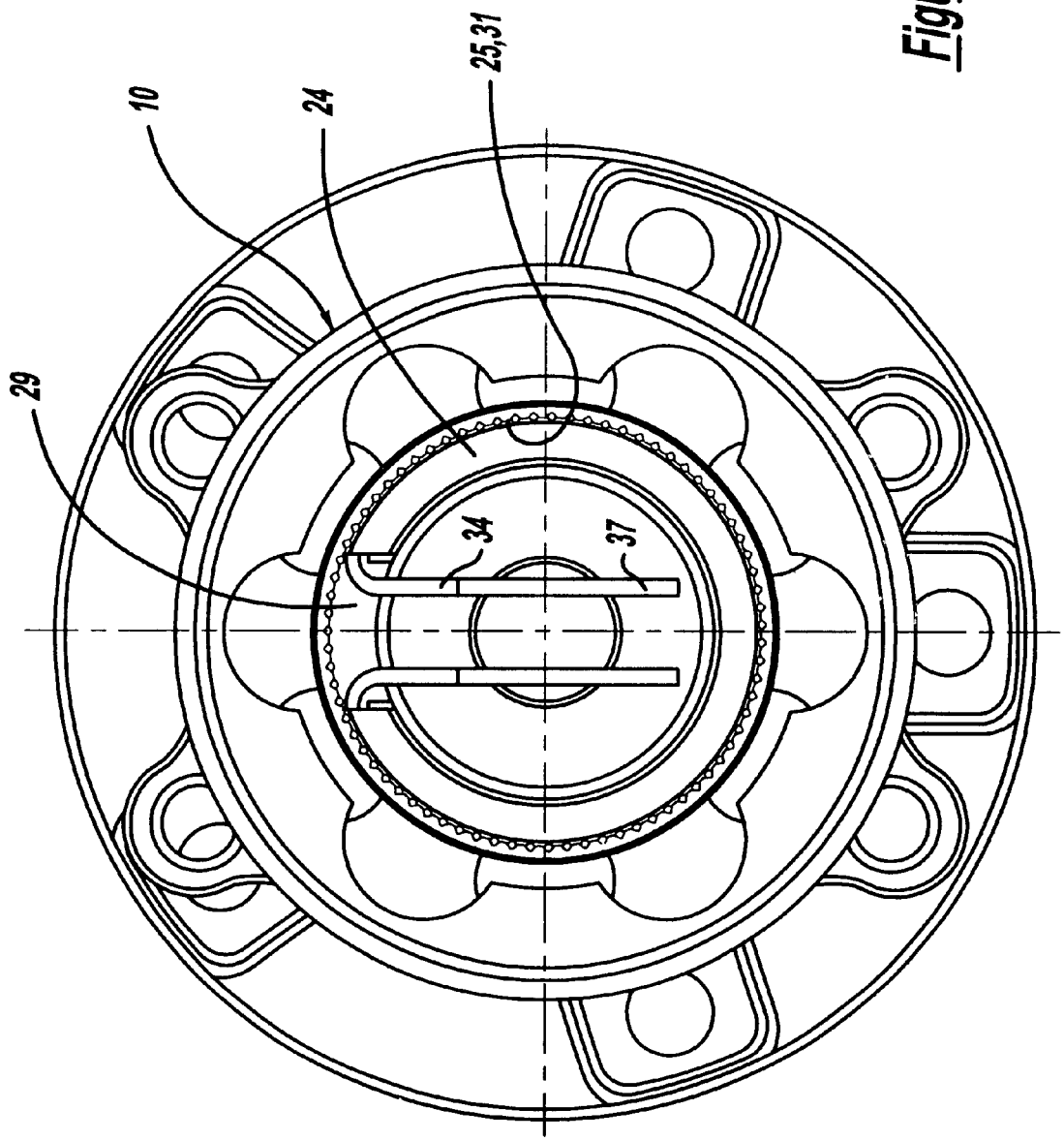
FIG. 2 is a view of the assembly of FIG. 1 in the direction of the arrow A in FIG. 1 with the internal diaphragm removed.

As shown in FIGS. 1 and 2, the flange 24 is provided with a slot 29. The slot extends radially of the flange from the outer surface 25 thereof to the bore 23. It also extends from the right-hand end of the flange 24 in FIG. 1 to the left-hand end 40 of the groove 33 in the flange. To assemble the parts 10 and 11 the ring 34 is first assembled on the flange 24 so that it is received in the groove 33. The arms 37 pass inwardly into the bore 23 through the slot 29.

By means of a pair of long-nosed pliers, not shown, inserted into the bore 23 from the left-hand end, the arms 37 can be moved towards one another thus to contract the circular part of the ring 35 so that the ring is wholly located in the groove 33. The outer race 10 can then be slid onto the flange 24 so that the splines 25 and 31 engage and the parts can be moved axially relative to one another until the grooves 32 and 33 are in alignment. The arms 37 can then be released with the result that the ring 34 assumes the position shown in FIG. 9 and the parts are secured together.

If desired there may be an O-ring seal 41 interposed between the flange 24 and the adjacent end of the portion 30 to exclude dirt etc. from the inter-engaging splines 25 and 31 and the grooves 32 and 33. The cavity 42 in the outer race 10 is sealed by means of a diaphragm 43 and the left-hand end of the bore 23 by a removable cap 42a.

To remove the outer race 10 from the bearing assembly long-nosed pliers are again inserted into the bore 23 from the left-hand end, which is the wheel side on the vehicle, and the arms are gripped to contract the ring into the groove 33 thus allowing the outer race to be removed. This is a convenient method of assembly and disassembly since it is carried out from the wheel side of the assembly so that it is possible to disassemble the bearing and the CV joint outer race when the assembly is in situ on a vehicle. It is also possible to reduce the distance X shown in FIG. 1 between the centre line of the CV joint outer race and the bearing by this construction. The cap 42a keeps dirt out of the bore 23 and can be removed to insert pliers to compress the ring 34.

Figure 1A:
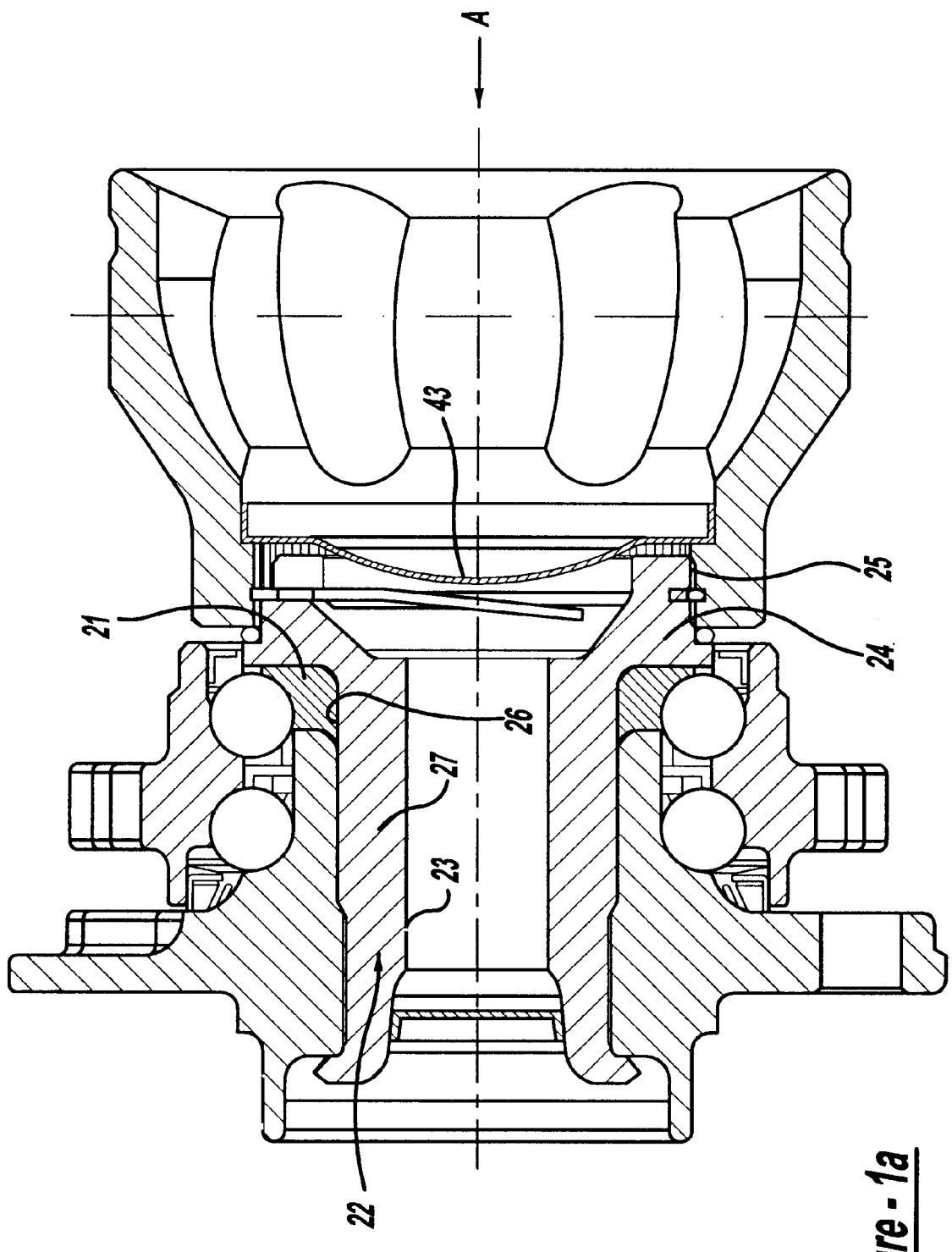
FIG. 1a is a vertical cross-section through a second embodiment of the invention.
Figure 3:
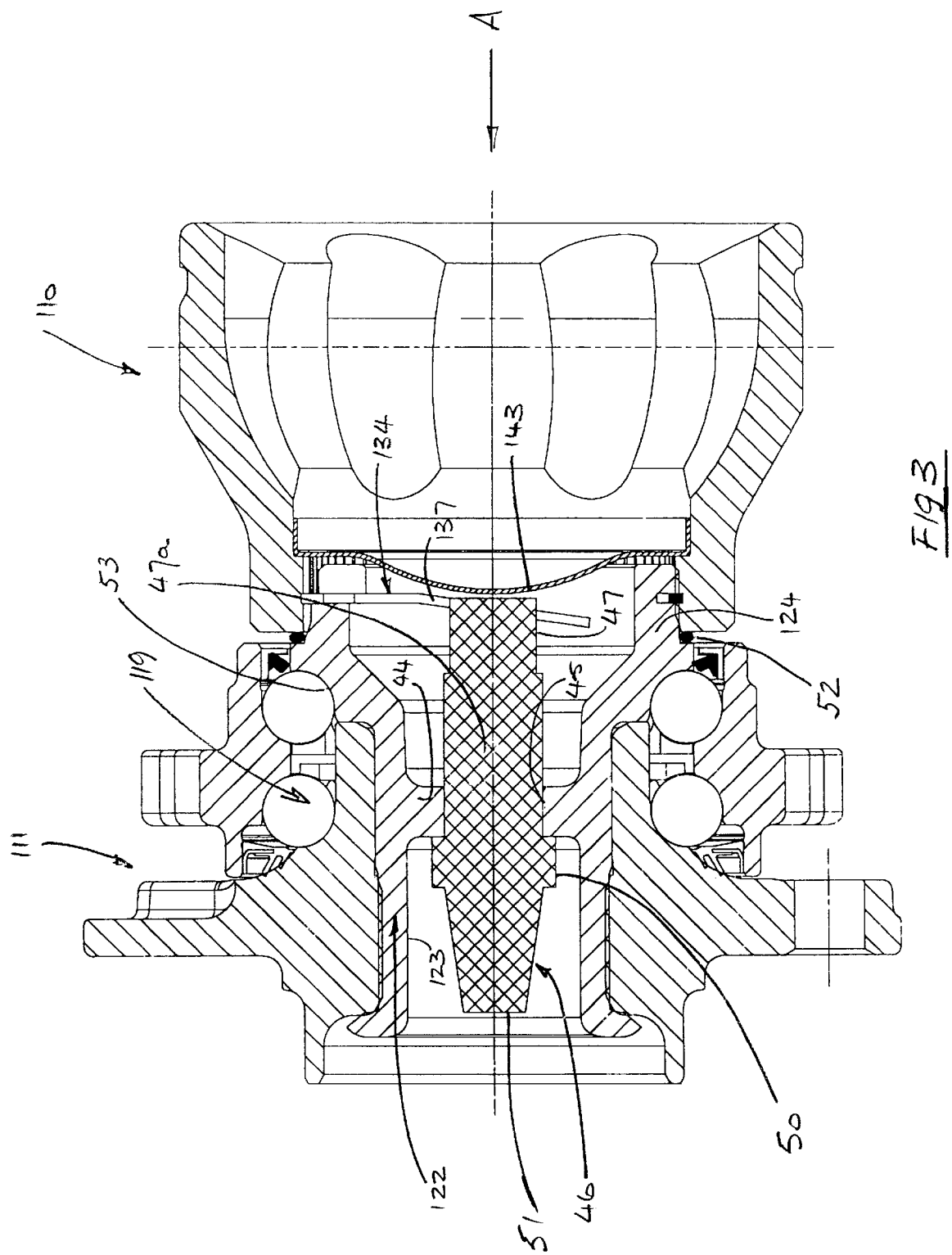
FIG. 3 is cross-section similar to FIG. 1 of a third embodiment of the invention.
Figure 4:
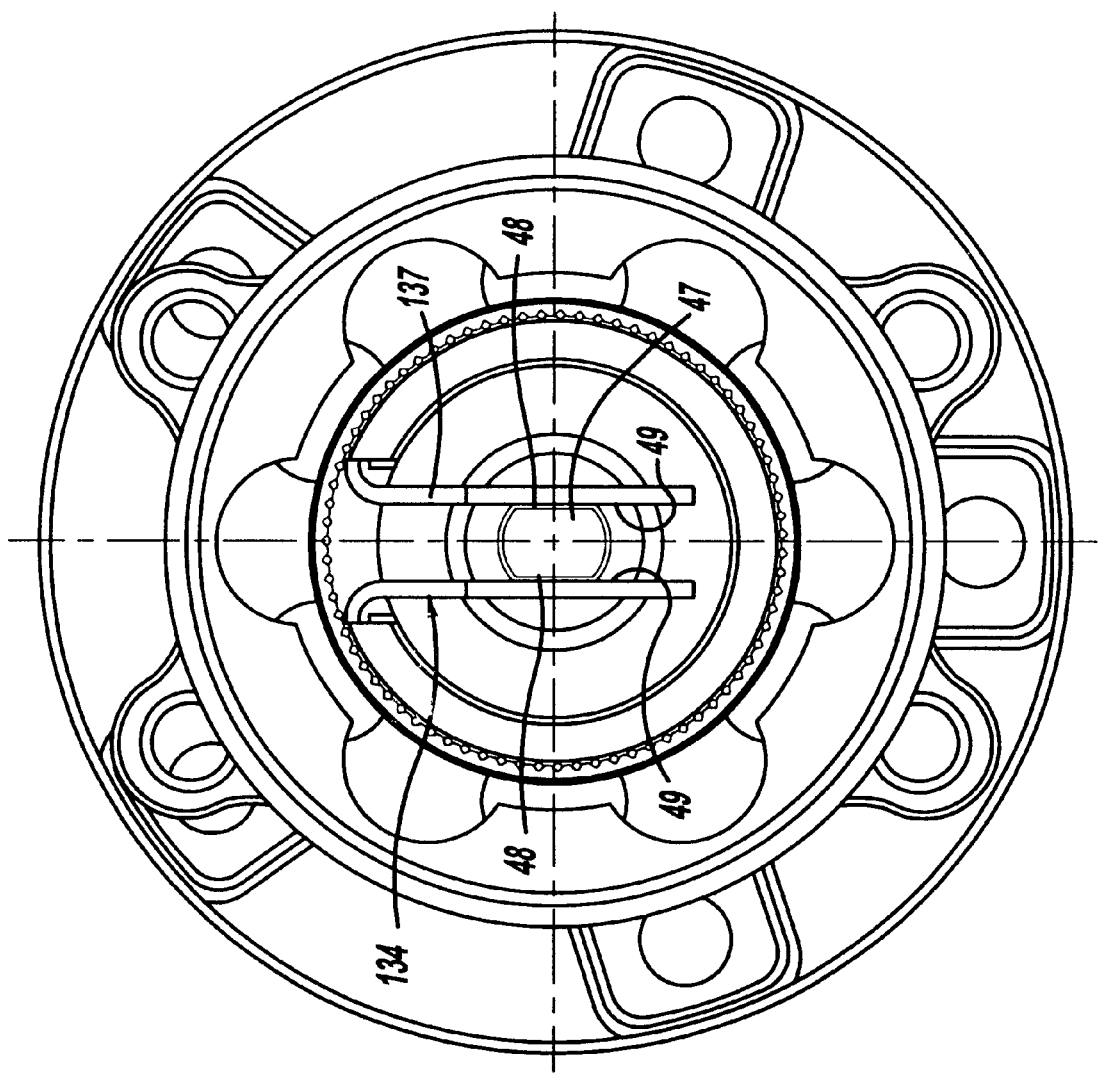
FIG. 4 is a view of the assembly of FIG. 3 in the direction of the arrow A in FIG. 3 with the internal diaphragm removed.

FIG. 1a differs from FIG. 1 only in the fact that the inner race 20a in FIG. 1 which is formed on the securing element 22 is, in FIG. 1a, replaced by a separate inner bearing race 21 which is located on a seat 26 on the flange 24. The bearing 19 is pre-loaded via the bearing race 21 as the left-hand end of the securing element is swaged over at 28. Similar parts in the two figures are referred to by the same reference numerals. Referring now to FIGS. 3 and 4, these show an embodiment of the invention which differs from that shown in FIG. 1 by the provision of a holding element to hold the arms of the spring ring apart. The same reference numerals are therefore used in FIGS. 3 and 4 as in FIGS. 1 and 2 but with the prefix 1.

In FIGS. 3 and 4, the bore 123 in the securing element 122 has an internal flange 44 which provides a central passage 45 in which is received a holding element 46. The holding element is made of a non-metallic material which may be resilient and has a first part 47 which is received between the arms 137 as shown in FIG. 4. The part 47 has oppositely directed surfaces 48 which engage with inwardly opposed surfaces 49 on the arms 137.

A second part of the holding element is indicated at 47a, is cylindrical and is a tight fit in the passage 45. This part 47a has a flange 50 so that it is prevented from moving too far to the right in FIG. 3. A tab 51 is formed on the holding element so that it may be gripped.

The parts 110 and 111 are assembled as described in relation to FIGS. 1 and 2 but when they have been assembled and the ring 134 has expanded to the position shown in FIG. 9 the holding element 46 is inserted into the passage 45 so that the first part 47 is engaged between the arms 137 and holds them apart thus holding the ring in the position shown in FIG. 9.

In the embodiment of FIGS. 3 and 4 there is a sealing ring 52 similar to the ring 41 shown in FIG. 9 and the inner race 53 of the right-hard row of balls is formed directly on the hub.

Figure 7:
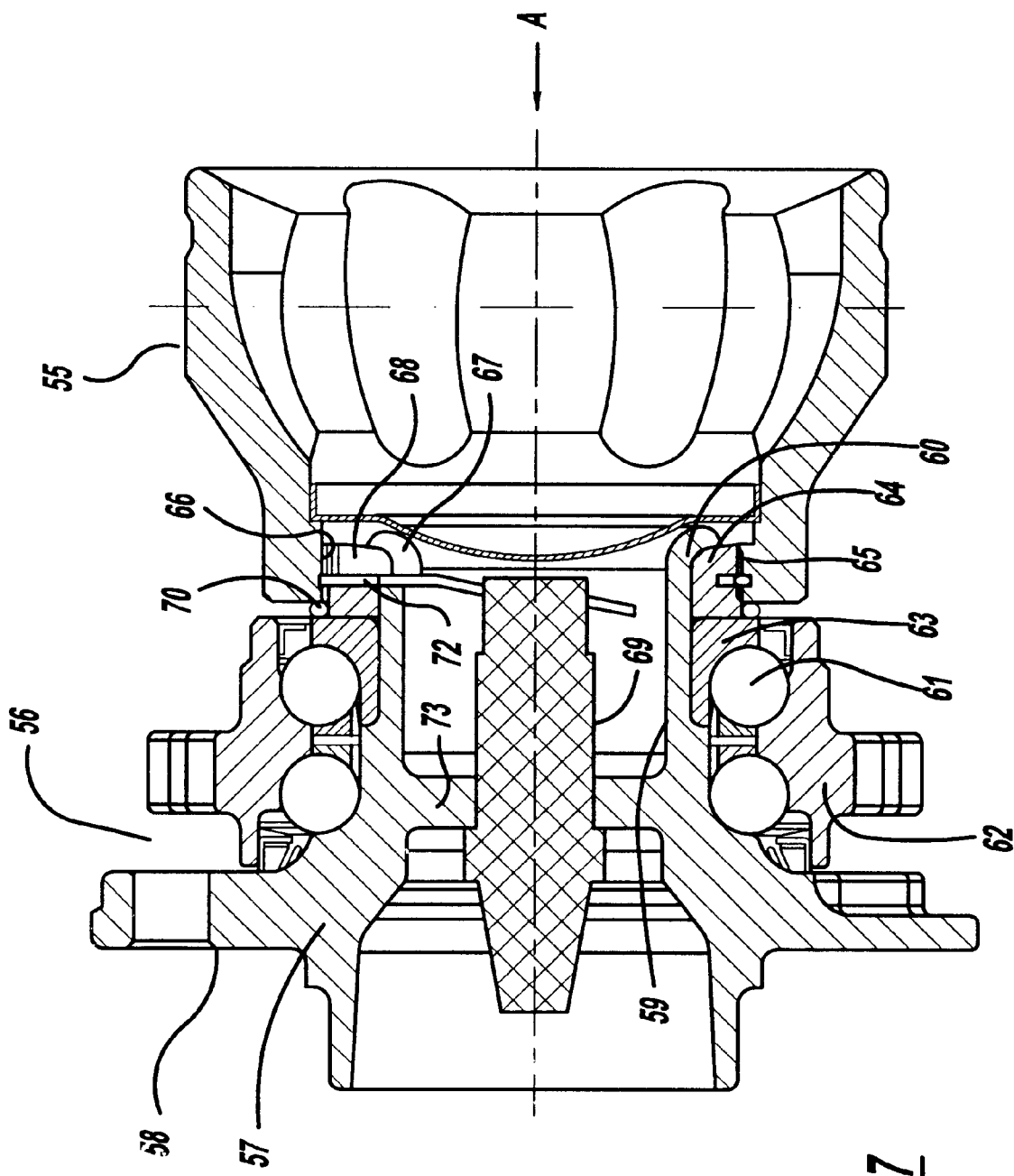
FIG. 7 is a cross-section similar to FIG. 1 of a fourth embodiment of the invention.
Figure 8:
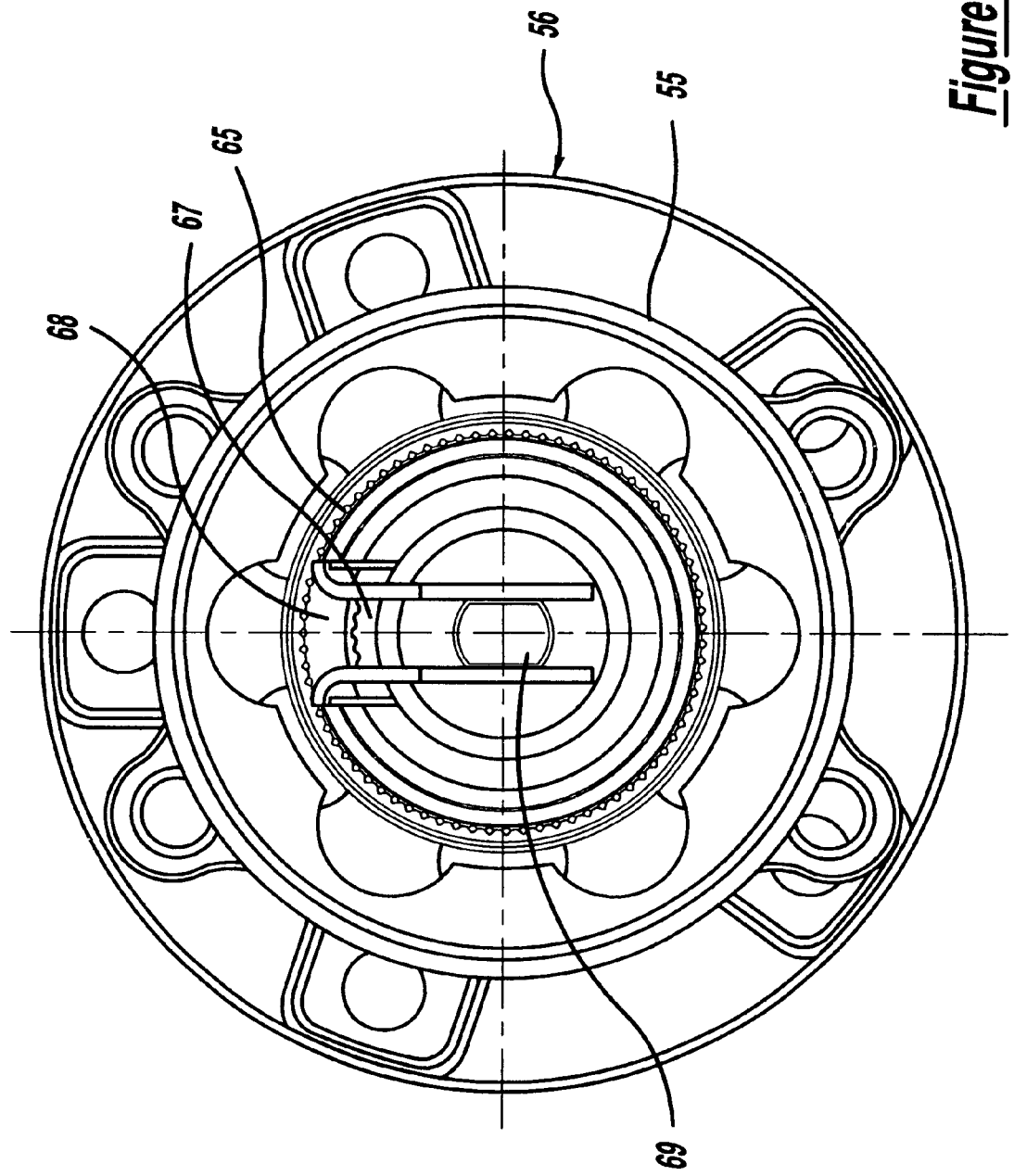
FIG. 8 is a view of the assembly of FIG. 7 in the direction of the arrow A in FIG. 7 with the internal diaphragm removed.

FIG. 7 shows a somewhat different construction to that shown in FIGS. 1 to 6. In this construction there is no securing element 22 or 122. Referring to FIGS. 7 and 8, the outer race of the constant velocity joint is indicated at 55 and the hub assembly at 56. The hub itself is indicated at 57 and has as before a flange 58 with bolts for receiving a road wheel. The hub has a bore 59 and at its right-hand end has an outwardly swaged portion 60. This swaged portion acts to pre-load a bearing 61 between the hub and a fixed portion 62 by pre-loading a separate inner race 63 as described above. Thus the portion 60 engages the right-hand end of a securing ring 64 which engages the race 63. The external surface of the securing ring is splined at 65 to engage internal splines 66 on the neck portion of the outer race 55.

Both the outwardly swaged portion 60 and the securing ring 64 are slotted at 67 and 68 respectively. In this case the internal groove such as 32 in FIG. 9 is formed in the outer race 55 as before but the external groove such as 33 is formed in the securing ring 64. The slot 68 extends from the right-hand end of the securing ring 64 to intersect with the external groove such as 33 in the securing ring 64.

Assembly of the parts is as described in relation to FIG. 1 and 2 in that the spring ring 72 of the form shown in FIGS. 5 and 6 is mounted in the external groove in the securing ring 64. The spring 72 is then contracted by being held through the bore 59 by pliers as described above to contract the spring ring into the external groove. The outer race 55 of the constant velocity joint is then slid onto the splines 65 of the securing ring, the arms of the spring ring are released and the ring takes up the position such as shown in FIG. 9 in which it is both in the external groove 33 and in the internal groove 32. Referring again to FIG. 7, an O-ring seal 70 is provided between the securing ring 64 and the adjacent end of the neck of the outer race 55 of the constant velocity joint.

As in FIG. 3, an internal flange 73 is provided in the bore 59 which receives a holding element 69 which acts as described in relation to FIGS. 3 and 4.

Where an element has been swaged outwardly as described this may be conveniently done by orbitally forming which allows the bearing to be pre-loaded as described simultaneously with the formation of the outwardly swaged part.

The holding element described may be so constructed as to hold the arms of the spring ring in a position in which the ring is received wholly in the external groove in one position and then may take up another position to hold the arms apart as shown in the drawings.

The diaphragm 43, 143 such as described in relation to FIGS. 1, 1a and 3 may be so located as to engage the right-hand end of the flange 24, 124 when the internal and external grooves are in alignment thus assisting with assembly of the parts.

The spring ring used will normally be of rectangular section as shown in FIG. 9 and will normally have a greater dimension radially than axially. The O-ring 41 may also be of rectangular section.

Oil seals such as 71 in FIG. 1 may be installed on each side of the bearing 19 or 119.

What is claimed is:

1. In an assembly comprising an external member having a first bore and an internal groove in the first bore, an internal member having an external groove, a second bore and a radial slot extending axially between said external groove and an end of the internal member, and a spring ring having adjacent to its ends, arms which extend generally radially inwardly, a method of securing together the external member in telescopic relationship with the internal member by the spring ring comprising:

mounting the spring ring in the external groove off the internal member so that the arms extend inwardly through said slot into the second bore;

releasably holding the spring ring in a contracted state so that it lies substantially within the external groove by engaging the arms in the second bore with a holding mechanism;

telescoping the internal member into the external member while the arms are engaged with the holding mechanism until the internal and external grooves are mutually aligned; and releasing the arms of the spring ring so that the spring ring expands to engage in both of the mutually aligned internal and external grooves.

2. A method according to claim 1 wherein the second bore has an open end and the holding mechanism is inserted into the second bore through said open end.

3. A method according to claim 2 wherein the external member is part of the outer race of a constant velocity joint and the internal member is part of a motor vehicle wheel bearing.

4. A method according to claim 1 wherein the holding mechanism is engaged with said arms by engaging oppositely-facing surfaces on the holding mechanism with generally-radial, opposed surfaces on the arms.

5. A method according to claim 1 comprising, after the spring ring has expanded to engage both of said internal and external grooves, inserting a holding element into the second bore and engaging said holding elements with the aims so that oppositely-facing surfaces on the holding element engage with opposed surfaces on the arms to hold the spring ring in an expanded state within both of said grooves.

6. An assembly comprising an outer race of a constant velocity joint and part of a motor vehicle wheel bearing, wherein the outer race has a first bore and an internal groove in the bore, and wherein the wheel bearing part has a second bore with an open end, an external groove, and a slot extending radially from the second bore between an inner end open to the second bore and an outer end at the external surface of the bearing part, the slot extending axially between said external groove and an end of the bearing part, the wheel bearing part and the outer race being held in assembled position by a spring ring engaged in said internal groove and said external groove, the spring ring having, adjacent its ends, arms which extend generally radially inwardly through said slot.

7. An assembly according to claim 6 comprising a holding element located in the second bore, the holding element having oppositely-facing surfaces which engage opposed surfaces on the arms so that said surfaces on the arms and the holding element can be disengaged by axially outward movement of the holding element relative to the arms, the holding element having a part remote from said surfaces whereby it may be gripped.

8. An assembly according to claim 6 wherein said wheel bearing part comprises a hub rotatably mounted in a fixed portion by rolling element bearings on an inner race, the hub having vehicle wheel mount, the rolling element bearings being pre-loaded by an outwardly projecting part on one of the hub and an element securing the hub and the inner race together.

9. As assembly according to claim 8 wherein said wheel bearing part includes a tubular securing element received in a third bore in the hub, the securing element having a flange at one end of said second bore to pre-load the bearings and being swaged outwardly at the other end of said second bore to engage the hub.

10. An assembly according to claim 9, wherein the external surface of the flange on the securing element and the internal surface of the first bore have inter-engaging splines.

11. An assembly according to claim 8 wherein said bearings are pre-loaded by said outwardly projecting part or flange.

12. An assembly according to claim 11 comprising a ring seal interposed between the projecting part or the flange and an adjacent end of the outer race, the ring seal being located between said slot and said inner bearing race.

13. An assembly according to claim 8 wherein the outwardly projecting part is on the hub and a securing ring is interposed between the outwardly projecting part and said bearings, an external surface of the securing ring and an internal surface of the first bore having inter-engaging splines.

14. An assembly according to claim 13 wherein said bearings are pre-loaded by said securing ring and said outwardly projecting part.

15. An assembly according to claim 14 comprising a ring seal interposed between the inner race and an adjacent end of the outer race, the ring seal being located between said slot and said inner bearing race.

16. An assembly according to claim 6 wherein the second bore has an internal flange whose inner periphery defines a passage to receive a holding element for the arms.

17. An assembly according to claim 16 wherein a holding element is located in the second bore, the holding element having oppositely-facing surfaces which engage opposed surfaces on the arms so that said surfaces on the arms and the holding element can be disengaged by axially outward movement of the holding element relative to the arms, the holding element having a part remote from said surfaces whereby it may be gripped.

18. An assembly according to claim 6 wherein the arms of the spring ring lie in a first plane at an angle to a second plane in which the remainder of the ring lies.

19. A telescopic assembly of an external member and an internal member wherein the external member has a first bore and an internal groove in the bore, the internal and external members being held in assembled position by a spring ring engaged in said internal groove and in an external groove of the internal member which has a second bore with an open end, the ring having, adjacent its ends, arms which extend generally radially inwardly through a slot extending radially from the second bore between an inner end open to the second bore and an outer end at the external surface of the internal member, the slot extending axially between said external groove and an end of the internal member.

* * * * *

UNITED STATES PATENT AND TRADEMARK OFFICE
CERTIFICATE OF CORRECTION

PATENT NO. : 6,524,012 B1
DATED : February 25, 2003
INVENTOR(S) : Frederick Uchman It is certified that error appears in the above-identified patent and that said Letters Patent is hereby corrected as shown below:

Drawings,
Delete Figure 3, and insert Figure 3 below.

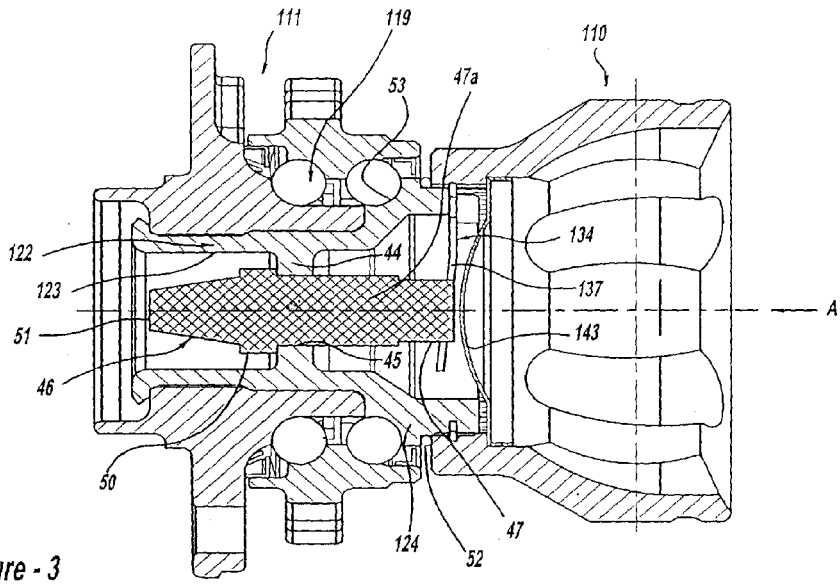

Signed and Sealed this

Seventeenth Day of August, 2004

JON W. DUDAS
*Acting Director of the United States Patent and Trademark Office*